(12) United States Patent
Rus et al.

(10) Patent No.: US 11,884,302 B2
(45) Date of Patent: Jan. 30, 2024

(54) SOCIAL BEHAVIOR FOR AUTONOMOUS VEHICLES

(71) Applicant: Massachusetts Institute of Technology, Cambridge, MA (US)

(72) Inventors: Daniela Rus, Weston, MA (US); Sertac Karaman, Cambridge, MA (US); Javier Alonso Mora, Cambridge, MA (US); Alyssa Pierson, Somerville, MA (US); Wilko Schwarting, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 198 days.

(21) Appl. No.: 17/099,035

(22) Filed: Nov. 16, 2020

(65) Prior Publication Data

US 2021/0146964 A1 May 20, 2021

Related U.S. Application Data

(60) Provisional application No. 62/936,033, filed on Nov. 15, 2019.

(51) Int. Cl.
*B60W 60/00* (2020.01)
*B60W 30/18* (2012.01)

(52) U.S. Cl.
CPC .......... *B60W 60/00272* (2020.02); *B60W 30/18163* (2013.01); *B60W 60/0013* (2020.02);
(Continued)

(58) Field of Classification Search
CPC ..... B60W 60/00272; B60W 30/18163; B60W 60/0013; B60W 60/0015;
(Continued)

(56) References Cited

U.S. PATENT DOCUMENTS

| 11,027,751 B2* | 6/2021 | Wray | G05D 1/0088 |
| 11,093,829 B2* | 8/2021 | Hu | B60W 10/18 |

(Continued)

OTHER PUBLICATIONS

National Highway Traffic Safety Administration, "Traffic Safety Facts 2015" (Tech. Rep. DOT HS 812 318, National Highway Traffic Safety Administration, Washington, DC, 2015), p. 101.

(Continued)

*Primary Examiner* — Peter D Nolan
*Assistant Examiner* — Anwar Mohamed
(74) *Attorney, Agent, or Firm* — Occhiuti & Rohlicek LLP

(57) ABSTRACT

Understanding the intent of human drivers and adapting to their driving styles is used to increased efficiency and safety of autonomous vehicles (AVs) by enabling them to behave in safe and predictable ways without requiring explicit inter-vehicle communication. A Social Value Orientation (SVO), which quantifies the degree of an agent's selfishness or altruism, is estimated by the AV for other vehicles to better predict how they will interact and cooperate with others. Interactions between agents are modeled as a best response game wherein each agent negotiates to maximize their own utility. A dynamic game solution uses the Nash equilibrium, yielding an online method of predicting multi-agent interactions given their SVOs. This approach allows autonomous vehicles to observe human drivers, estimate their SVOs, and generate an autonomous control policy in real time.

26 Claims, 8 Drawing Sheets

(52) U.S. Cl.
CPC . *B60W 60/0015* (2020.02); *B60W 2554/4029* (2020.02); *B60W 2554/4044* (2020.02); *B60W 2554/4046* (2020.02)

(58) Field of Classification Search
CPC . B60W 2554/4029; B60W 2554/4044; B60W 2554/4046; B60W 30/18159; B60W 60/0011
See application file for complete search history.

(56) References Cited

U.S. PATENT DOCUMENTS

| | | | | |
|---|---|---|---|---|
| 11,110,917 | B2* | 9/2021 | Stimpson | B60W 60/0011 |
| 11,117,584 | B2* | 9/2021 | D'sa | B60W 30/18163 |
| 11,242,051 | B1* | 2/2022 | Konrardy | G08G 1/096791 |
| 11,242,054 | B2* | 2/2022 | Isele | B60W 30/16 |
| 2014/0236414 | A1* | 8/2014 | Droz | G08G 1/015 701/1 |
| 2020/0276988 | A1* | 9/2020 | Graves | B60W 30/18159 |
| 2021/0262808 | A1* | 8/2021 | Wang | B60W 30/09 |
| 2021/0279514 | A1* | 9/2021 | Turcot | G06V 10/454 |
| 2021/0309220 | A1* | 10/2021 | Rudenko | G06V 20/53 |
| 2022/0055496 | A1* | 2/2022 | Barber | B60L 53/16 |
| 2022/0169247 | A1* | 6/2022 | Borrello | B60W 40/072 |

OTHER PUBLICATIONS

J. Stewart, Why people keep rear-ending self-driving cars. Wired (2018) https://www.wired.com/story/self-driving-car-crashes-rear-endings-why-charts-statistics/.
C. Urmson et al., Autonomous driving in urban environments: Boss and the urban challenge. J. Field Robot. 25, 425-466 (2008).
J. Leonard et al., A perception-driven autonomous urban vehicle. J. Field Robot. 25, 727-774 (2008).
M. Düring, P. Pascheka, "Cooperative decentralized decision making for conflict reso-lution among autonomous agents" in 2014 IEEE International Symposium on Innova-tions in Intelligent Systems and Applications (INISTA) Proceedings (IEEE, Piscataway, NJ, 2014), pp. 154-161.
W. Schwarting, P. Pascheka, "Recursive conflict resolution for cooperative motion planning in dynamic highway traffic" in 17th International IEEE Conference on Intelligent Transportation Systems (ITSC) (IEEE, Piscataway, NJ, 2014), pp. 1039-1044.
A. Pierson, L. C. Figueiredo, L. C. Pimenta, M. Schwager, Adapting to sensing and actuation variations in multi-robot coverage. Int. J. Robot. Res. 36, 337-354 (2017).
D. Sadigh, S. Sastry, S. A. Seshia, A. D. Dragan, "Planning for autonomous cars that leverage effects on human actions" in Proceedings of Robotics: Science and Sys-tems, D. Hsu, N. Amato, S. Berman, S. Jacobs, Eds. http://www.roboticsproceedings.org/rss12/p29.html. Accessed Nov. 15, 2019.
R. Spica et al., "A real-time game theoretic planner for autonomous two-player drone racing" in, Proceedings of Robotics: Science and Systems. http://www.roboticsproceedings.org/rss14/p40.pdf. Accessed Nov. 15, 2019.
G. Williams, B. Goldfain, P. Drews, J. M. Rehg, E. A. Theodorou, "Best response model predictive control for agile interactions between autonomous ground vehicles" in 2018 IEEE International Conference on Robotics and Automation (ICRA), K. Lynch, et al., Eds. (IEEE, Piscataway, NJ, 2018), pp. 2403-2410.
A. Liniger, J. Lygeros, A noncooperative game approach to autonomous racing. IEEE Trans. Control Syst. Technol., 8643396 (2019).
C. K. De Dreu, P. A. Van Lange, The impact of social value orientations on negotiator cognition and behavior. Personal. Soc. Psychol. Bull. 21, 1178-1188 (1995).
C. G. McClintock, S. T. Allison, Social value orientation and helping behavior. J. Appl. Soc. Psychol. 19, 353-362 (1989).
P. A. Van Lange, The pursuit of joint outcomes and equality in outcomes: An integra-tive model of social value orientation. J. Personal. Soc. Psychol. 77, 337-349 (1999).
R. O. Murphy, K. A. Ackermann, Social value orientation: Theoretical and measure-ment issues in the study of social preferences. Personal. Soc. Psychol. Rev. 18, 13-41 (2014).
J. L. Pletzer et al., Social value orientation, expectations, and cooperation in social dilemmas: A meta-analysis. Eur. J. Personal. 32, 62-83 (2018).
K. A. Ackermann, R. O. Murphy, Explaining cooperative behavior in public goods games: How preferences and beliefs affect contribution levels. Games 10, 15 (2019).
R. O. Murphy, K. A. Ackermann, M. Handgraaf, Measuring social value orientation. Judgment Decis. Making 6, 771-781 (2011).
P. A. Van Lange, E. De Bruin, W. Otten, J. A. Joireman, Development of prosocial, individualistic, and competitive orientations: Theory and preliminary evidence. J. Personal. Soc. Psychol. 73, 733-746 (1997).
W. B. G. Liebrand, C. G. McClintock, The ring measure of social values: A comput-erized procedure for assessing individual differences in information processing and social value orientation. Eur. J. Personal. 2, 217-230 (1988).
D. Balliet, C. Parks, J. Joireman, Social value orientation and cooperation in social dilemmas: A meta-analysis. Group Process. Intergr. Relat. 12, 533-547. (2009).
A. Garapin, L. Muller, B. Rahali, Does trust mean giving and not risking? Experimental evidence from the trust game. Rev. E' con. Polit. 125, 701-716 (2015).
J. P. Carpenter, Is fairness used instrumentally? Evidence from sequential bargaining. J. Econ. Psychol. 24, 467-489 (2003).
S. Fiedler, A. Glöckner, A. Nicklisch, S. Dickert, Social value orientation and informa-tion search in social dilemmas: An eye-tracking analysis. Organ. Behav. Hum. Decis. Process. 120, 272-284 (2013).
S. Ross, G. Gordon, D. Bagnell, "A reduction of imitation learning and structured pre-diction to no-regret online learning" in Proceedings of the Fourteenth International Conference on Artificial Intelligence and Statistics, G. Gordon, D. Dunson, M. Dud'?k, Eds. (Proceedings of Machine Learning Research, Fort Lauderdale, FL, 2011), vol. 15, pp. 627-635.
J. Ho, S. Ermon, Generative adversarial imitation learning in Advances in Neural Information Processing Systems 29, D. D. Lee, M. Sugiyama, U. V. Luxburg, I. Guyon, R. Garnett, Eds. (Neural Information Processing Systems Foundation, 2016), pp. 4565-4573.
B. D. Ziebart, A. L. Maas, J. A. Bagnell, A. K. Dey, "Maximum entropy inverse rein-forcement learning" in Proceedings of the 23rd AAAI Conference on Artificial Intelligence, A. Cohn, Ed. (Association for the Advancement of Artificial Intelligence, Palo Alto, CA, 2008), vol. 8, pp. 1433-1438.
H. Kretzschmar, M. Spies, C. Sprunk, W. Burgard, Socially compliant mobile robot navigation via inverse reinforcement learning. Int. J. Robot. Res. 35, 1289-1307 (2016).
B. D. Ziebart et al., "Planning-based prediction for pedestrians" in 2009 IEEE/RSJ Inter-national Conference on Intelligent Robots and Systems (IEEE, Piscataway, NJ, 2009), pp. 3931-3936.
R. O. Murphy, K. A. Ackermann, Social preferences, positive expectations, and trust based cooperation. J. Math. Psychol. 67, 45-50 (2015).
T. Gärling, S. Fujii, A. Gärling, C. Jakobsson, Moderating effects of social value orien-tation on determinants of proenvironmental behavior intention. J. Environ. Psychol. 23, 1-9 (2003).
P. A. Van Lange, R. Bekkers, T. N. Schuyt, M. V. Vugt, From games to giving: Social value orientation predicts donations to noble causes. Basic Appl. Soc. Psychol. 29, 375-384 (2007).
J. D'Attoma, C. Volintiru, A. Malezieux, Gender, social value orientation, and tax compliance (CESifo Working Paper 7372, CESifo, Munich, 2018).
K. A Ackermann, J. Fleiß, R. O. Murphy, Reciprocity as an individual difference. J. Confl. Resolut. 60, 340-367 (2016).
F. Moisan, R. ten Brincke, R. Murphy, C. Gonzalez, Not all prisoner's dilemma games are equal: Incentives, social preferences, and cooperation. Decision 5, 306-322 (2017).
J. Andreoni, J. Miller, Giving according to GARP: An experimental test of the consistency of preferences for altruism. Econometrica 70, 737-753 (2002).

(56) References Cited

OTHER PUBLICATIONS

S. Levine, K. Vladlen, Continuous inverse optimal control with locally optimal examples in Proceedings of the 29th International Conference on Machine Learning, J. Langford, J. Pineau, Eds. (Omnipress, 2012), pp. 475-482.
M. Pilecka et al., Combined reformulation of bilevel programming problems. Schedae Inf. 21, 65-79 (2012).

* cited by examiner

SOCIAL BEHAVIOR FOR AUTONOMOUS VEHICLES

CROSS-REFERENCE TO RELATED APPLICATIONS

This application claims the benefit of U.S. Provisional Application No. 62/936,033, filed Nov. 15, 2019, the contents of which are incorporated in their entirety herein by reference.

BACKGROUND

This application relates to social behavior for autonomous vehicles.

Interacting with human drivers is one of the great challenges of autonomous driving. To operate in the real world, autonomous vehicles (AVs) need to cope with situations requiring complex observations and interactions, such as highway merging and unprotected left-hand turns, which are challenging even for human drivers. For example, over 450,000 lane-change/merging accidents and 1.4 million right/left turn accidents occurred in the United States in 2015 alone. Currently, AVs lack an understanding of human behavior, thus requiring conservative behavior for safe operation. Conservative driving creates bottlenecks in traffic flow, especially in intersections. This conservative behavior not only leaves AVs vulnerable to aggressive human drivers and inhibits the interpretability of intentions, but also can result in unexpected reactions that confuse and endanger others. In a recent analysis of California traffic incidents with AVs, in 57% of crashes the AV was rear-ended by human drivers, with many of these crashes occurring because the AV behaved in an unexpected way that the human driver did not anticipate. For AVs to integrate onto roadways with human drivers, they must understand the intent of the human drivers and respond in a predictable and interpretable way.

While planning a left turn may be trivial for an AV on an empty roadway, it remains difficult in heavy traffic. For human drivers, these unprotected left turns often occur when an oncoming driver slows down to yield, an implicit signal to the other driver it is safe to turn. AVs that rely solely on explicit communication, state machines, or geometric reasoning about the driving interactions, neglecting social cues and driver personality, cannot handle complex interactions, resulting in conservative behavior and limiting autonomy solutions to simple road interactions. Additionally, humans cannot directly quantify and communicate their actions and decisions to autonomous agents.

SUMMARY

In a general aspect, the ability of autonomous vehicles (AVs) to reason is extended by incorporating estimates of the other drivers' personalities and driving styles from social cues. This allows an AV to handle more complex navigation scenarios that rely on interactions, such as situations involving multiple vehicles in an intersection. An approach described herein is based on a mathematical formulation that combines control-theoretic approaches with models and metrics from the psychology literature, behavioral game theory, and machine learning.

In one or more embodiments, the AV is able to measure, quantify, and predict human behavior to better inform its operation. A game-theoretic formulation models driving as a series of social dilemmas to represent the dynamic interaction between drivers. A direct solution of the best response game enables fast, online predictions and planning, while integrating environmental and planning constraints to ensure safety. The game's reward functions are dynamic and dependent on the vehicles' states and the environment. The reward functions is learned from human driving data, and therefore the approach translates to other traffic scenarios and broadly, human-robot interactions outside the field of autonomous vehicle control, where similar predictions may be trained on relevant data. Using Social Value Orientation (SVO), a metric known from psychology, the AV quantifies human social preferences and their corresponding levels of cooperation. SVO is used to measure how an individual weights their reward against the rewards of others, which translates into altruistic, prosocial, egoistic or competitive preferences. The human drivers' SVOs are estimated from observed motion, and the AV's SVO is set based on the scenario.

DETAILED DESCRIPTION

1 Overview

System

Figure 1:
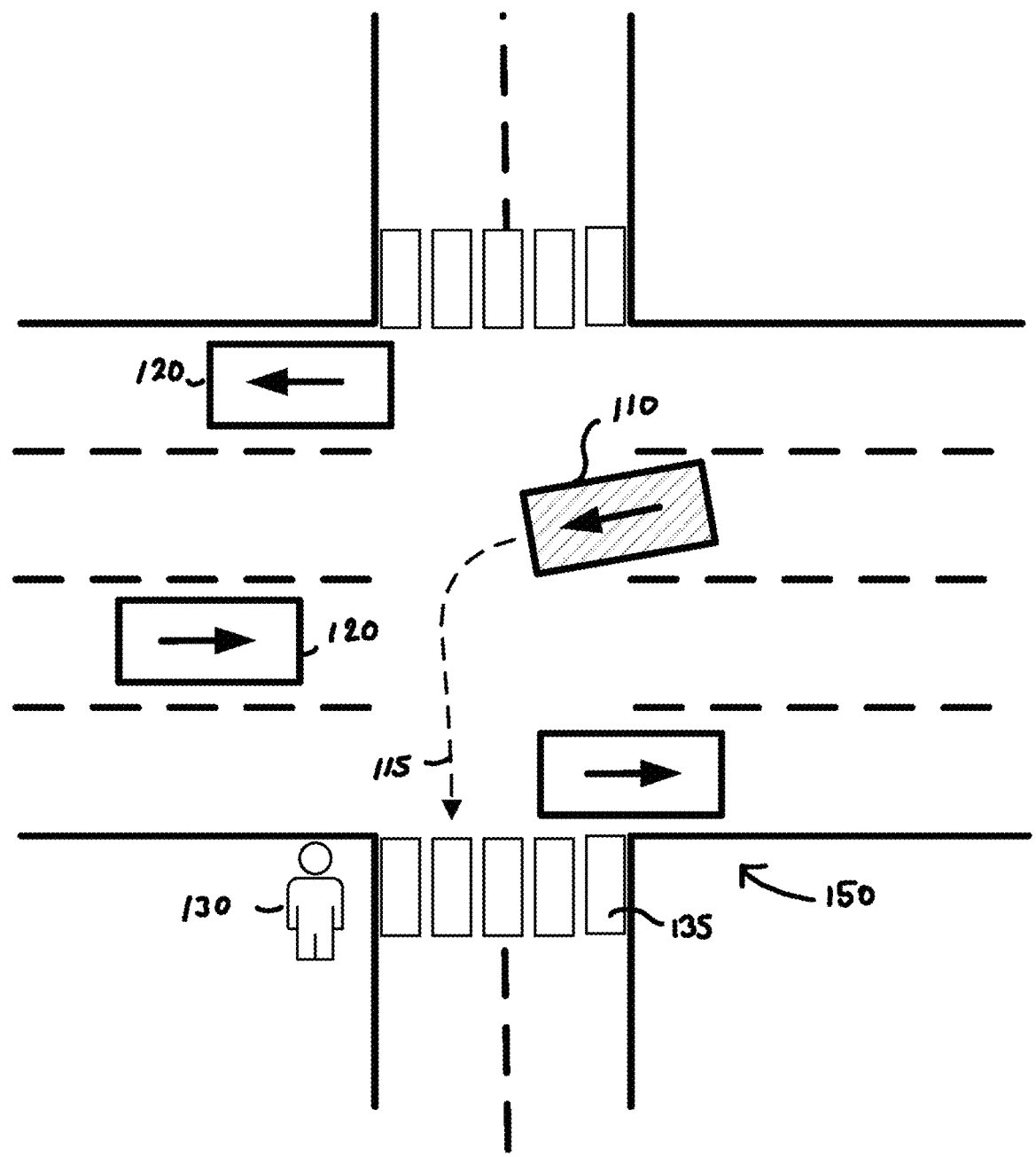
FIG. 1 is a schematic of a roadway with automonous and human operated vehicles.

Referring to FIG. 1, an autonomous vehicle 110 operates in presence one or more mobile entities, in this example, operating on a roadway 150 in the presence of other vehicles 120. In this example, these other vehicles are human operated vehicles, but it should be recognized that the approaches described below are also applicable to such other vehicles 120 being autonomous or implementing driving assistance (e.g., speed control, lane deviation control etc.). Furthermore, the approaches are applicable for the mobile entities including pedestrians 130, for example, approaching or traversing a crosswalk 135 on the roadway. A controller for the vehicle 110, for example, executing on an on-board computing system, monitors operation of the other vehicles 120 and/or pedestrians 130, for example using vehicle mounted sensors (e.g., LIDAR). This monitoring includes, for each of the other vehicle, estimating a corresponding social behavior score for that vehicle 120 based at least in part on the monitored operation. The social behavior scores for the other vehicles are then used by the controller in planning operations of the autonomous vehicle 110, for example, to make a safe left turn (represented as dotted line 115)

Various types of quantitative or categorical social behavior scores may be used. As discussed in more detail in this document, in a preferred embodiment, the score used comprises a Social Value Orientation (SVO), which may comprise a quantity representing a degree of one or more of altruistic, prosocial, egotistic, competitive, and sadistic behavior, and/or a degree of one or more of cooperative and selfish behavior. In some implementations, the social behavior score comprises a tuple of multiple component scores, each associated with a different behavior characteristic.

The social behavior score is used in planning the operation of the autonomous vehicle by predicting further operation of the other vehicles based on their respective social behavior scores. That is, two vehicles in the same relative position to the autonomous vehicle may have very different predicted future behavior if they have different scores. For example, cooperative other vehicle may be expected to make room for the autonomous vehicle to merge into its lane, while a selfish vehicle may be expected to accelerate to close a gap to prevent the autonomous vehicle from merging.

Driving as a Game

Figure 2:
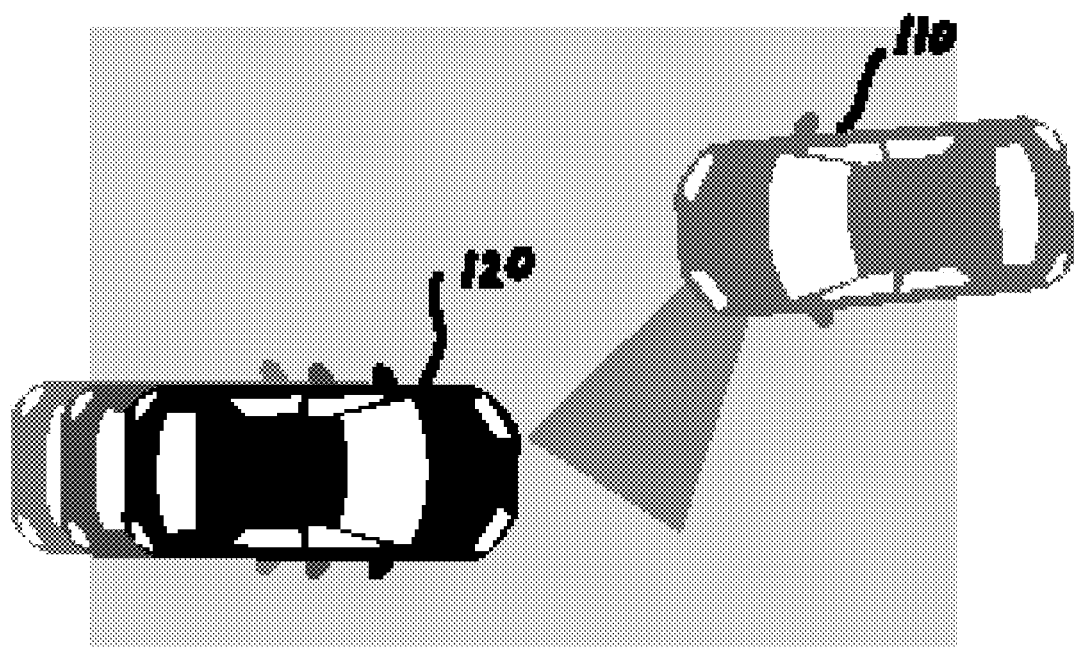
FIG. 2 is schematic diagram of an autonomous preparing to make a left turn in the face of oncoming traffic.
Figure 3:
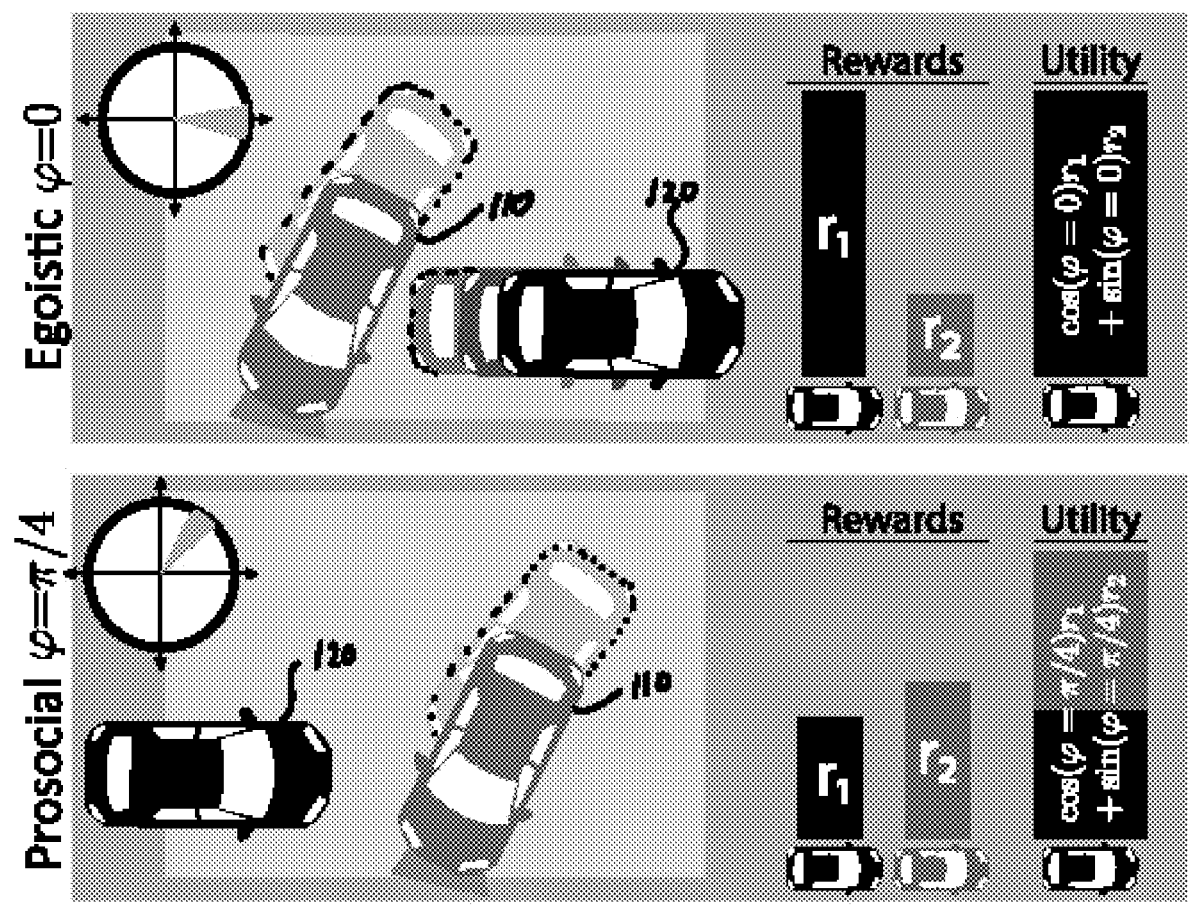
FIG. 3 is a diagram showing predicted trajectories for different candidate SVO values.

For the purpose of controlling the AV 110, driving is mathematically modeled as a non-cooperative dynamic game, where the driving agents maximize their accumulated reward, or "payout," over time. At each point in time, each agent receives a reward, which may be defined by factors like delay, comfort, distance between cars, progress to goal, and other priorities of the driver. FIGS. 2-3 illustrate an example of a driving game: an unprotected left turn. Knowing a driver's SVO helps predict their behavior. Here, the AV 110 observes the trajectories of the other human driver 120. The AV can predict future motion of the vehicle 120 for candidate SVOs based on a utility-maximizing decision model (see, e.g., Section 3). If the human driver of vehicle 120 is egoistic, they may not yield and the AV would have to wait to turn. If the human driver is prosocial, they will yield and the AV can safely turn. In both cases, the human driver is modeled as utility-maximizing, but the utility function for the human driver varies by SVO. An egoistic driver considers only its own reward in computing its utility. A prosocial driver weights its reward with the reward of the other car. The most-likely SVO is the one that best matches a candidate trajectory to the actual observed trajectory (see, e.g., Section 2.1). The AV predicts future motion using the most-likely SVO estimate In FIG. 2, the vehicle 110 must make a left turn across the path of the vehicle 120. Depending on how the interaction is resolved, the agents accrue different rewards for decisions such as comfortable braking, waiting for others to pass, or safety. For the sake of discussion, the controller of the AV is referred to as a "driver" of the AV, as is the human operator of the human-operated vehicle. In FIGS. 2-3, if each driver only maximizes their own reward, then the vehicle 120 would never brake for the vehicle 110 making the unprotected left turn. However, human drivers often brake for others in an act of altruism or cooperation. Similarly, in highway driving, human drivers may open gaps for merging vehicles. If all agents were to act in pure selfishness, the result would be increased congestion and therefore a decrease in the overall group's reward. Driving therefore poses a sequence of social dilemmas.

Social Coordination

Social dilemmas often involve a conflict between the agent's short-term self-interest and the group's longer-term collective interest. Social dilemmas occur in driving, where drivers must coordinate their actions for safe and efficient joint maneuvers. Other examples include: resource depletion, low voter turnout, overpopulation, the prisoner's dilemma, or the public goods game. The autonomous control system for AVs described herein builds on social preferences of human drivers to predict outcomes of social dilemmas: whether individuals cooperate or defect, such as opening or closing a gap during a traffic merge. It allows the AV to better predict human behavior, thus offering a better basis for decision-making. It may also improve the efficiency of the group as a whole through emerging cooperation, for example by reducing congestion.

Social Value Orientation

Figure 4:
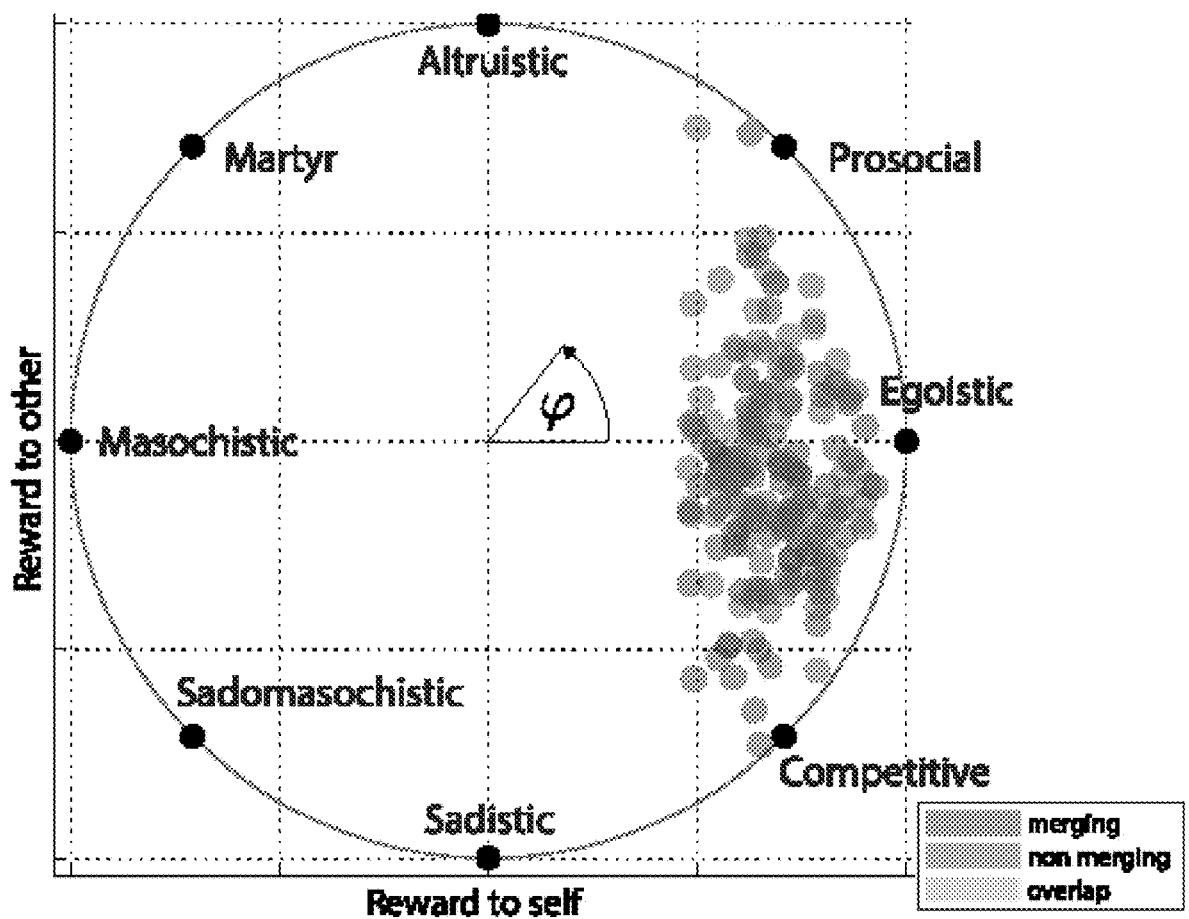
FIG. 4 is a diagram of SVO represented in angular form, with sample points for merging and non-merging drivers.

Behavioral and experimental economics have shown that people have unique and individual social preferences, including: interpersonal altruism, fairness, reciprocity, inequity aversion, and egalitarianism. Some self-interested models assume agents maximize only their own reward in a game, but such models fail to account for nuances in real human behavior. In contrast, Social Value Orientation (SVO) indicates a person's preference of how to allocate rewards between themselves and another person. SVO can predict cooperative motives, negotiation strategies, and choice behavior. SVO preferences can be represented (e.g., quantified) in a variety of ways, including with a slider measure, a discrete-form triple dominance measure, or as an angle $\varphi$ within a ring. In the implementations below, SVO is represented in angular notation, as shown in FIG. 4.

Returning to FIG. 2, SVO helps explain when the car 120 yields. Here, the car 120 considers both its reward and the reward of the car 110, weighted by SVO. As the angular preference increases from egoistic to prosocial, the weight of the other agent's reward increases, making it more likely the car 120 will yield. Knowing a vehicle's SVO helps an AV better predict the actions of that vehicle, and allows it to complete the turn if cooperation is expected. Without SVO it may have to wait conservatively until all cars cleared the intersection.

Figure 5:
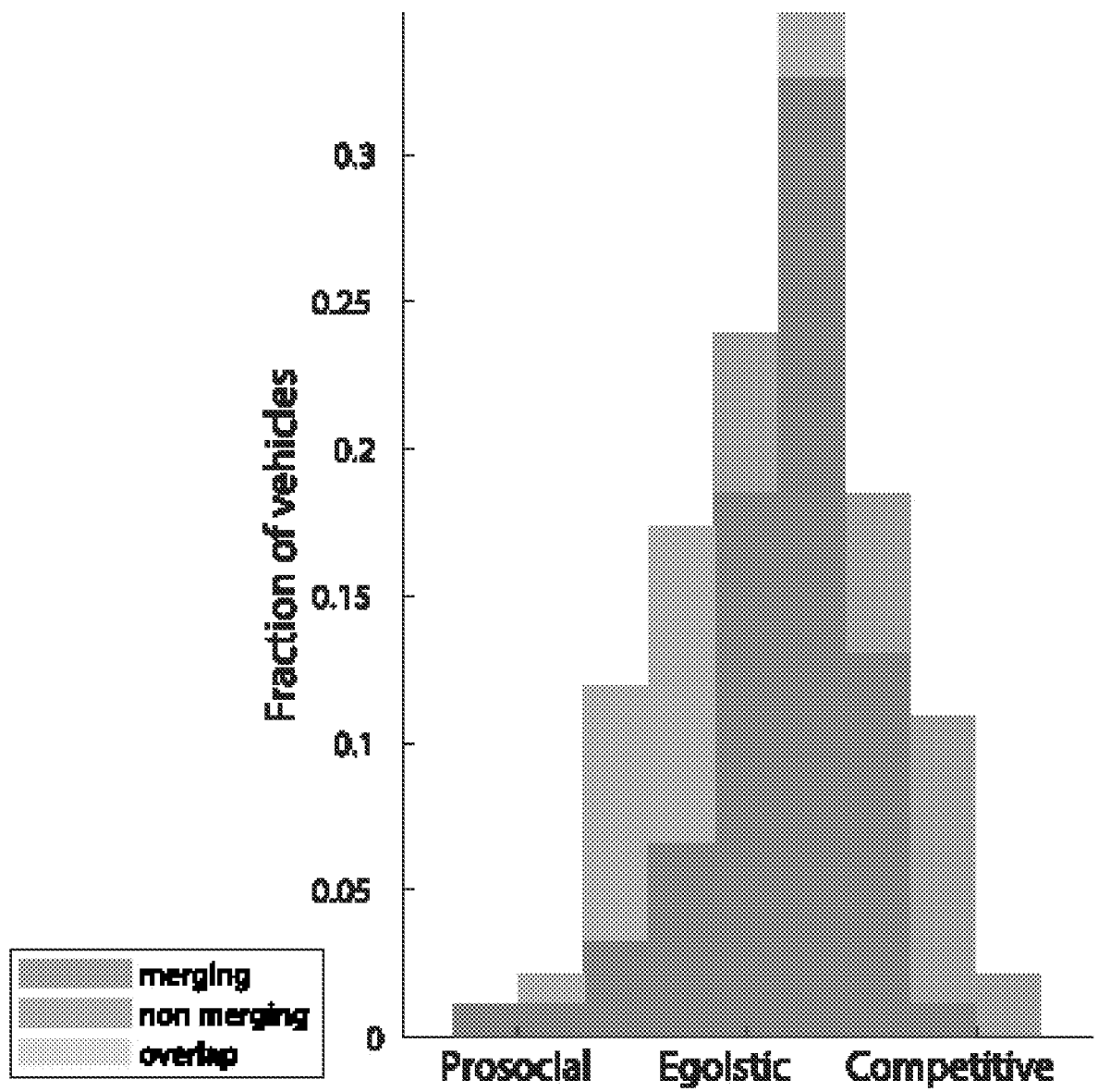
FIG. 5 is a distiribution of SVO for merging as compared to non-merging drivers.

In this approach, the human operators or their vehicles do not have to communicate directly with the AV. Rather, the AV observes and estimates SVO from actions and social cues much in the way humans may judge other drivers' characteristics. SVO preference distributions of individuals are largely individualistic (~40%) and prosocial (~50%), which emphasizes that a SVO-based model will be more accurate than a purely selfish model. In these embodiments, the AV estimates SVOs of other drivers by determining the SVO that best fits predicted trajectories to the actual observed (i.e., sensed) driver trajectories. This technique enables the estimation and study of SVO distributions of agent populations directly from trajectory data, extending beyond driving. In this example, the estimated SVOs for drivers merging in the NGSIM data set in FIG. 5.

Socially-Compliant Driving

The control policy of the AV uses SVO estimates of human drivers. We define socially-compliant driving as behaving predictably to other human and autonomous agents during the sequence of driving social dilemmas. Achieving socially-compliant driving in AVs is fundamental for the safety of passengers and surrounding vehicles, since behaving in a predictable manner enables humans to understand and appropriately respond to the AV's actions. To achieve socially-compliant driving, the autonomous system behaves as human-like as possible, which is based on an intrinsic understanding of human behavior as well as the social expectations of the group. Human behavior may be imitated by learning human policies from data through Imitation Learning. In a number of embodiments, the AV control approach enables social compliance by learning human reward functions through Inverse Reinforcement Learning (IRL). The optimal control policy of the best response game with learned rewards yields a human-imitating policy. Mathematically, the imitating policy is the expectation of human behavior based on past observed actions, capable of predicting and mimicking human trajectories. Combined with SVO this enables an AV to behave as a human driver is expected to behave in traffic scenarios, such as acting more competitively during merges, and mirroring the utility-maximization strategies of humans with heterogeneous social preferences in social dilemmas.

When designing a cooperative AV, it may be desirable to assign the AV a prosocial SVO. Prosocials exhibit more fairness and considerateness compared to individualists, and engage in more volunteering, pro-environment, pro-community, and charitable efforts. They also tend to minimize differences in outcomes between self and others (inequality aversion, egalitarianism). Other research suggests reciprocity in SVO and resulting cooperation.

To make the unprotected turn in FIG. 2, the AV first observes the trajectory of the oncoming car, which can be done with onboard sensors. Using the reward (payoff) structure learned from data and our utility-maximizing behavior model, it generates candidate trajectories based on possible SVO values. The most likely SVO is the one that best matches a candidate trajectory to the actual observed trajectory. With this estimated SVO, the AV then generates future motion predictions and plans when to turn safely.

2 Estimating Driver Behavior with SVO

In the approaches described herein, SVO is integrated into a non-cooperative dynamic game, and the agents are modeled as making utility-maximizing decisions, with the optimization framework presented in Section 3. To integrate SVO into our game-theoretic formulation, a utility function $g(\cdot)$ combines the rewards of the ego agent with other agents, weighted by the ego agent's SVO angular preference $\varphi$. For a two-agent game, $$g_1 = \cos(\varphi_1) r_1(\cdot) + \sin(\varphi_1) r_2(\cdot), \quad (1)$$

where $r_1$ and $r_2$ are the "reward to self" and "reward to other," respectively, and $\varphi_1$ is the ego agent's SVO. We see that the orientation of $\varphi_1$ will weight the reward $r_1$ against $r_2$ based on the ego agent's actions. The following definitions of social preferences are based on these weights:

Altruistic: Altruistic agents maximize the other party's reward, without consideration of their own outcome, with $$\varphi \approx \frac{\pi}{2}.$$

Prosocial: Prosocial agents behave with the intention of benefiting a group as a whole, with $$\varphi \approx \frac{\pi}{4}.$$

This is usually defined by maximizing the joint reward.

Individualistic/Egoistic: Individualistic agents maximize their own outcome, without concern of the reward of other agents, with $\varphi \approx 0$. The term egoistic is also used.

Competitive: Competitive agents maximize their relative gain over others, i.e.

$$\varphi \approx -\frac{\pi}{4}.$$

While the definitions give specific values of SVO preferences for clarity, we also note that SVO exists on a continuum. For example, values in the range $$0 < \varphi < \frac{\pi}{2}$$

all exhibit a certain degree of altruism. We denote cooperative actions as actions that improve the outcome for all agents. For example, two egoistic agents may cooperate if both benefit in the outcome. Prosocials make cooperative choices, as their utility-maximizing policy also values a positive outcome of others. These cooperative choices improve the efficiency of the interaction and create collective value.

2.1 Measuring and Estimating SVO Online

Given that other drivers maximize utility, we can predict their trajectories from observations and an estimate of their SVO. The choice of SVO changes the predicted trajectories. In FIG. 3 a prosocial SVO generates a braking trajectory prediction, while an egoistic SVO generates a non-braking trajectory. We compute the likelihood of candidate SVOs from evaluating the Gaussian kernel on the distance between predicted and actual trajectories. We also consider a maximum entropy model, which builds a likelihood function based on the distance of the observed trajectory to optimality given a candidate SVO. We utilize these methods to estimate SVO from human driver trajectories in Section 4.

2.2 Benefit of SVO

We improve predictions of interactions by estimating SVO of other drivers online. Incorporating SVO into the model increases social compliance of vehicles in the system, by improving predictability and blending in better. For the AVs, SVO adds the capability of nuanced cooperation with only a single variable. The AV's SVO can be specified as user input, or change dynamically according to the driving scenario, such as becoming more competitive during merging.

3 Driving as a Game in Mixed Human Robot Systems

To create a socially-compliant autonomous system, the autonomous agents determine their control strategies based on the decisions of the human and other agents. This section details how we incorporate a human decision-making model into an optimization framework. We formulate the utility-maximizing optimization problem as a multi-agent dynamic game, then derive the Nash equilibrium to solve for a socially-compliant control policy.

Consider a system of m human drivers and autonomous agents, with states such as position, heading, and speed, at time k denoted $x_i^k \in \chi$, where $i = \{1, \ldots, m\}$ and $\chi \in \mathbb{R}^n$ is the set of all possible states. We denote $u_i^k \in \mathcal{U}$ as the control input, such as acceleration and steering angle, of agent i and $\varphi_i \in \Phi$ as SVO preference, where $\mathcal{U} \in \mathbb{R}^n$ is the set of all possible control inputs and $\Phi$ is the set of possible SVO preferences. For brevity, we write the state of all agents in the system as $x = [x_1^T, \ldots, x_m^T]$, all control inputs as $u = [u_1^T, \ldots, u_m^T]^T$. The states evolve according to dynamics $\mathcal{F}_i(x_i^k, u_i^k)$ subject to constraints $c_i(\cdot) \leq 0$ with the discrete-time transition function $$x^{k+1} = \mathcal{F}(x^k, u_k) = [\mathcal{F}_1(x_1^k, u_1^k)^T, \ldots, \mathcal{F}_m(x_m^k, u_m^k)^T]^T \quad (2)$$

The notation $x_{-i}$ refers to the set of agents excluding agent i. For example, we can write the state vector $x=[x_1^T|x_{-1}^T]^T$, with $x_{-1}=[x_2^T, \ldots, x_m^T]^T$. The agents calculate their individual control policies $u_i$ by solving a general discrete-time constrained optimization over N time steps and time horizon $\tau=\Sigma_{k=1}^N \Delta t$. The set of states over the horizon is denoted as $x^{0:N}$, and the set of inputs is $u^{0:N-1}$. To calculate the control policy, we formulate a utility function for each agent, then find the utility-maximizing control actions. The utility function is defined as a combination of reward functions $r_i(\cdot)$, as described in (1), and calculated from weighted features of the current state, controls, the environment, and social preference $\varphi_i$. At a given time k, each agent i's utility function is given by $g_i(x^k, u^k, \varphi_i)$, and $g_i^N(x^N, \varphi_i)$. The utility over the time horizon $\tau$ is denoted $G_i(\cdot)$, written $$G_i(x^0, u, \varphi_i) = \sum_{k=0}^{N-1} g_i(x^k, u^k, \varphi_i) + g_i^N(x^N, \varphi_i). \quad (3)$$

The reward functions $r_i(\cdot)$ is learned from the NGSIM driving data to approximate real human behavior.

3.1 Human Decision-Making Model

From psychology literature, we find that people are heterogeneous in their evaluation of joint rewards, and we can model preferences for others using utility functions that weight rewards. Accordingly, we model human agents in our system as agents that make utility-maximizing decisions. Translating this decision-making into an optimization framework for socially-compliant behavior, we write the utility-maximizing policy $$u_i^*(x^0, \varphi_i) = \operatorname*{argmax}_{u_i} G_i(x^0, u_i, u_{-i}, \varphi_i). \quad (4)$$

The solution $u_i^*$ to (4) also corresponds to the actions maximizing the likelihood under the maximum entropy model $$P(u_i|x^0, u_{-i}, \varphi_i) \ni \exp(G_i(x^0, u_i, u_{-i}, \varphi_i)), \quad (5)$$

used to learn our rewards by IRL. Under this model, the probability of actions u is proportional to the exponential of the utility encountered along the trajectory. Hence, utility-maximization yields actions most likely imitating human driver behavior, which is important for social compliance.

Although the human driver does not explicitly calculate u, we assume our model and formulation of u captures the decision-making process of the human driver based on their observations, control actions, and underlying reward function $r_i(\cdot)$ of the environment. Later, we validate on the NGSIM data set that our learned model successfully predicts the actual trajectories driven by the human drivers.

3.2 Game-Theoretic Autonomous Control Policy with SVO

To design the control policy for the AV, note that (4) formulated for all m agents simultaneously defines a dynamic game. Given SVO estimates for all agents and a set of constraints on the system, we solve for the optimal control policy of a vehicle, $u_i^*$, assuming the other agents in the system also choose an optimal policy, $u_{-i}^*$. For an intuition on how these dynamic games work, we first start with a Stackelberg game. An example traffic scenario that can be modeled as a Stackelberg game is cars arriving at a four-way stop, where they must traverse the intersection based on the first arrival. In the traditional two-agent Stackelberg game the leader (i=1) makes its choice of policy, $u_1$, and the follower (i=2) maximizes their control given the leader policy, $u_2^*(u_1)$. While the Stackelberg game can model some intersections, in many traffic scenarios, it is unclear who should be the leader and the follower, thus necessitating a more symmetric and simultaneous choice game, which is the approach we use herein. In the two-agent case, the follower chooses $u_2(u_1)$, but the leader re-adjusts based on the follower, or $u_1(u_2)$. This back-and-forth creates more levels of tacit negotiation and best response, such that $u_2(u_1(u_2(u_1(\ldots))))$. This strategy removes the leader-follower dynamics, as well as any asymmetric indirect control, yielding a simultaneous choice game.

Nash Equilibrium

The iterative process of exchanging and optimizing policies is also called iterative best response, a numerical method to compute a Nash equilibrium of the game defined by (4). A limitation is its iterative nature; optimizing may take an unacceptable amount of steps. To make solving for the Nash equilibrium computationally tractable, we reformulate the m interdependent optimization problems as a local single-level optimization using the Karush-Kuhn-Tucker (KKT) conditions. We solve the locally-equivalent formulation, including all constraints, with state-of-the-art nonlinear optimizers. This preserves all safety constraints in the optimization, critical for guaranteeing safe operation and performance Algorithm 1 provides an overview of the method.

The Nash equilibrium yields a control law for the AV $u_i^*$ as well as predicted actions $u_{-i}^*$ for all other m−1 agents N time steps into the future. Based on learned reward functions and the maximum entropy model, (5), $u_{-i}^*$ are also maximum likelihood predictions. The Nash equilibrium is the predicted outcome of the driving social dilemma and mimics the negotiation process between agents.

---

Algorithm 1 Socially-Compliant Autonomous Driving

---

1: $x^0 \leftarrow$ Update state observations of all agents
2: $\varphi_{-1} \leftarrow$ Update SVO estimation of all agents
3: $\varphi_1 \leftarrow$ Choose AV SVO, Section 2.2
4: $u^* \leftarrow$ Plan and predict for all agents (4)
   (Multi-Agent Nash Equilibrium)
5: Execute AV's optimal control $u^*_1$

---

4 Methods and Results

The socially-compliant driving algorithm is implemented in two ways: first to predict human driver behavior in highway merges, then in simulations of autonomous merging and turning scenarios. This section highlights illustrative examples of the results obtained with the described approach. We evaluate human driver predictions on the NGSIM data set and examine highway on-ramp merges into congestion. We analyze a total of 92 unique merges from the data set and discuss key results on a representative example. Incorporating SVO reduces errors in trajectory predictions of human drivers by up to 25%. For the AV simulations, we replicate this merging scenario, and also present an unprotected left turn. Our simulations demonstrate how utilizing SVO preferences assists the AV in choosing safe actions, adding nuanced behavior and cooperation with a single parameter.

4.1 Predicting Human Driving Behavior

To validate our algorithm, we test its ability to predict human trajectories on highway on-ramp merges in the NGSIM data set. We implement a non-interactive baseline algorithm, where each agent computes their optimal policy while modeling other agents as lane-keeping dynamic obstacles. Using the dataset and trajectory history, we compare the baseline prediction's performance to the multi-agent game theoretic models with (i) static egoistic SVO, equal to neglecting the SVO model, (ii) best static SVO, and (iii) estimated dynamic SVOs. The best static SVO corresponds to the best SVO estimate when holding it constant throughout the interaction. For different interactions, this may yield a different static SVO. Table 1 examines the relative position error between the true vehicle trajectory and our predictions. We find that incorporating the multi-agent game theoretic framework, but remaining egoistic, alone improves performance by 5%. Highlighting the importance of SVO, we see an 18% improvement over the baseline with static SVO and 25% with estimated dynamic SVO.

TABLE 1

| Prediction | baseline | multi-agent game theoretic | | |
|---|---|---|---|---|
| SVO | — | egoistic | static best | estimated |
| MSE position | 1.0 | 0.947 | 0.821 | 0.753 |

Figure 6:
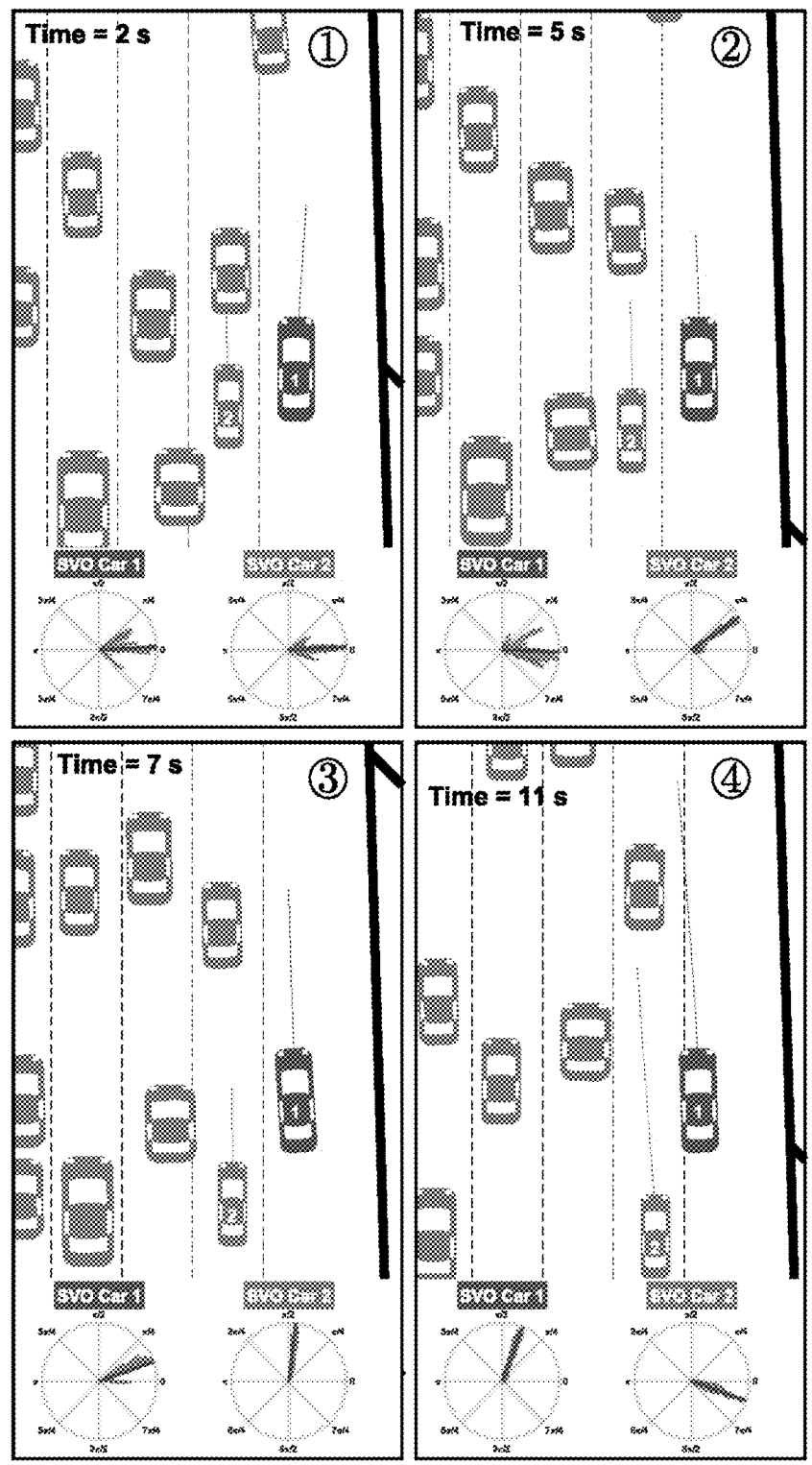
FIG. 6 is an illustration of four time snapshots of a car attempting to merge.
Figure 7:
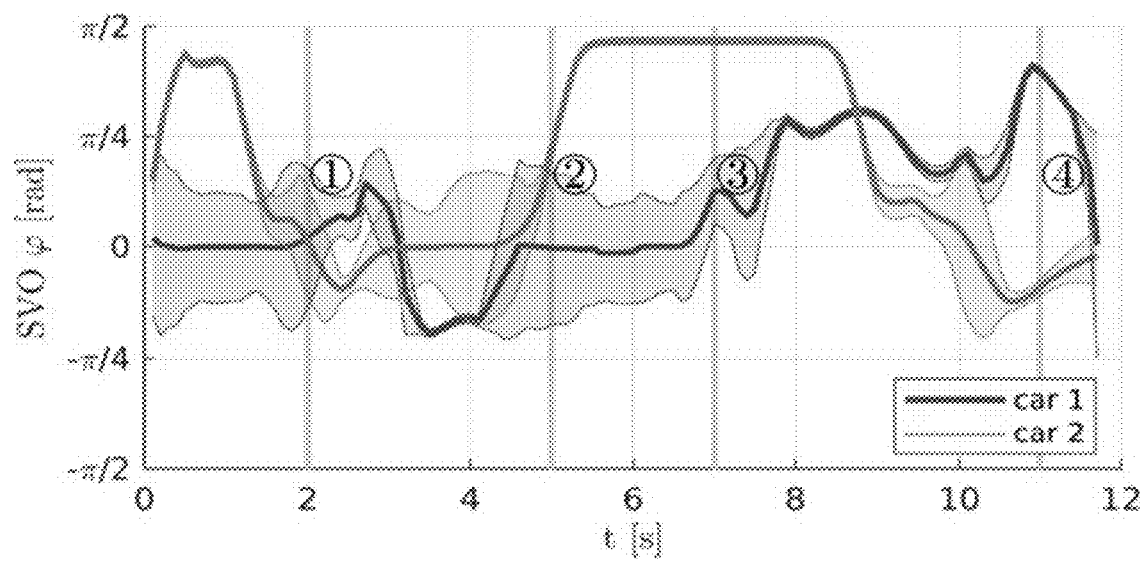
FIG. 7 is is graph of SVO over the interval of the car of FIG. 6 attempting to merge.

FIG. 6 shows a two-agent merge with car 1 merging into the lane with car 2. We model the other cars in the data set as obstacles for the planner. For a dynamic SVO prediction, we estimate SVO online from observed trajectories of the vehicles, then leverage SVO in predicting the trajectory. FIG. 7 shows SVO predictions and confidence bounds for both cars through the merge. Our SVO estimates help explain the interactions occurring: At $t=2$, the first car's SVO is egoistic while attempting to merge, but the second car is also egoistic and does not provide a sufficient gap to merge. At $t=5$, the second car drops back and increases the gap for merging, corresponding to a more prosocial estimated SVO. Once the first car has merged, the second car closes the gap, returning to an egoistic SVO.

The capability of estimating SVOs of humans by observing their motions allows us to investigate how SVO distributions in natural populations differ. Separating merging and non-merging vehicles in the dataset, we find that merging cars are more likely to be competitive than non-merging cars, shown in the histogram of FIG. 5. This observation also withstands hypothesis testing with statistical significance ($p<0.002$).

4.2 Autonomous Merging with SVO

Figure 8:
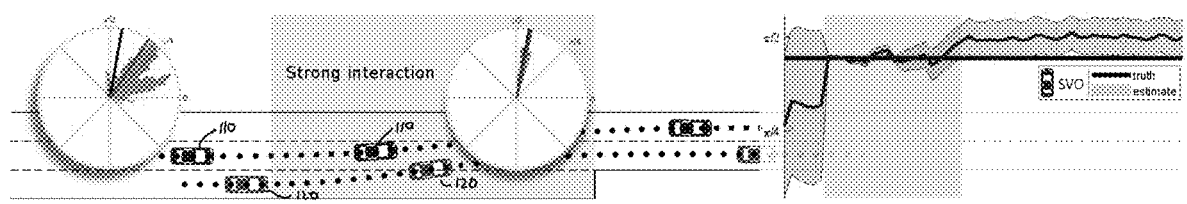
FIG. 8 is a diagram illustrating an autonomous merging operation.

We are able to measure SVO preference of another agent in a simulated highway merging scenario. FIG. 8 shows the AV's SVO estimates of another vehicle over time. At first, the vehicles have little interaction, and the observations of the driver's SVO remain ambiguous, such that the estimate is inaccurate with high variance. As the AV approaches the end of its lane, both vehicles begin to interact, indicated in gray in the figure. During this time, SVO estimate quickly converges to the true value, with high confidence. After the merge, the vehicles no longer interact, and the variance of the SVO estimate increases and the estimate drifts away from the true value. Note that estimating the characteristics of an interaction (e.g. SVO) is only possible if the interaction between agents is impactful.

4.3 Unprotected Left Turns

Figure 9:
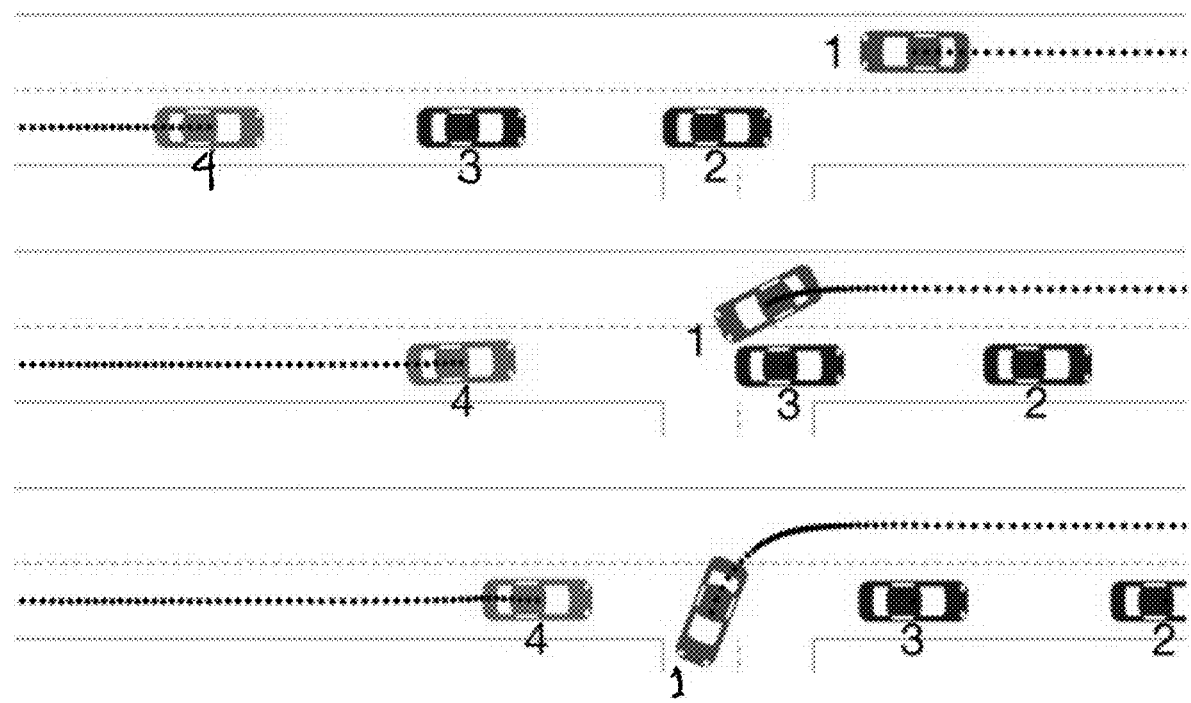
FIG. 9 is a diagram illustrating an unprotected left turn.

In this scenario, the AV must make an unprotected left turn against numerous cars traveling in the oncoming direction. If the AV were in light traffic, it could be feasible for it to wait for all other oncoming cars to pass. However, in congested traffic, the intersection might never fully clear. Instead, the AV must predict when an oncoming car will yield, allowing the vehicle to safely make the turn. FIG. 9 shows our simulation, where the AV ($i=1$) attempts to turn across traffic. Two egoistic cars ($i=2, 3$) approach the intersection and do not yield for the AV, as predicted. An altruistic third car ($i=4$) yields for the AV by slowing down, such that the gap between itself and the other car increases. With this increased gap, the AV is able to safely make the turn, and the other car continues forward.

5 Implementations and Alternatives

Detailed use of the methodology is provided in the incorporated Application No. 62/936,033 (e.g., see the part titled "Supplementary Information for Social Behavior for Autonomous Vehicles", beginning at sheet 7). Furthermore, the publication Schwarting, Wilko, Alyssa Pierson, Javier Alonso-Mora, Sertac Karaman, and Daniela Rus. "Social behavior for autonomous vehicles." *Proceedings of the National Academy of Sciences* 116, no. 50 (2019): 24972-24978, including the Supplentary Information, is also incorporated herein by reference, providing details of the approaches described above.

In the field of use of autonomous vehicle control, the approaches described above may be implemented in software, for example, using instructions stored on non-transitory machine-readable media in an autonomous vehicle. These instructions may be processed using a data processor, such as a special-purpose or general purpose processor onboard the vehicle. This processor is coupled to the controls of the vehicle enabling it to control its speed and trajectory, and in some embodiments, signal other vehicles, for example, using turn signals, the horn, etc. Inputs to the processor may include sensor signals (e.g., for LIDAR sensor, vision system, etc.), which allow the processor to track the other vehicles (or pedestrians), in the vicinity. In some examples, some or all of the processing may be performed off the vehicle, for example, using a server-based processing system in communication with the vehicle. Furthermore, in such a server-based approach, SVO estimates may be performed such that characteristics of vehicles may be computed centrally and shared with multiple AVs in their vicinty.

While many examples are described above with an autonomous vehicle estimating SVO of surrounding human operatored vehicles, the approach is equally applicable to estimating SVO of surrounding autonomous vehicles. These other autonomous vehicles may have a wide range of control algorithms embedded in them, or a range of different control states, which may be well-characterized using SVO or similar measure of cooperative behavior. Such a characterization may improve the control of an AV in a heterogeneous environment of other AVs.

While described in the context of controlling an autonomous vehicle, onboard estimation of SVO for other drivers may be incorporated into driver assistance systems. For example, an "intelligent" blindspot warning system may take into account the SVO of the vehicles in an adjacent lane, thereby warning the human driver if the SVO indicates a high likelihood that an adjacent driver will not permit a merge operation. Similarly, the approaches described above may be incorporated into driver assistance systems, such as a "cruise control" system, whereby the SVO of adjacent vehicles may be used in controlling a separation from preceding or following vehicles in the same lane.

As introduced above, the vehicles are not necessarily automobiles. For example, essentially the same approaches may be used to control other vehicles, such as autonomous wheelchairs or in-building assistant robots (e.g., in a home or a medical facility), in the presence of pedestrian traffic, for example, in a hallway.

A number of embodiments have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for operating an autonomous vehicle in the presence of one or more mobile entities, the method comprising:
    monitoring interactions between the one or more mobile entities and/or between the autonomous vehicle and the one or more mobile entities, including for each mobile entity of the one or more mobile entities, estimating a corresponding social behavior score for said entity based at least in part on the monitored interactions;
    planning an operation of the autonomous vehicle using the estimated social behavior score for each of the one or more mobile entities; and
    causing the autonomous vehicle to operate according to the planned operation,
    wherein planning the operation of the autonomous vehicle includes performing a computer-implemented multi-agent game-theoretically based decision process
    wherein estimating the social behavior score comprises estimating a Social Value Orientation (SVO).

2. The method of claim 1, wherein monitoring the interactions of the one or more mobile entities comprises monitoring motion of said autonomous vehicle and/or said one or more mobile entities.

3. The method of claim 1, wherein the autonomous vehicle comprises an autonomous automotive vehicle operating on a roadway.

4. The method of claim 1, wherein the one or more mobile entities comprise an autonomous automotive vehicle.

5. The method of claim 1, wherein the one or more mobile entities comprise a human-operated vehicle.

6. The method of claim 1, wherein the one or more mobile entities comprises a pedestrian.

7. A method for operating an autonomous vehicle in the presence of one or more mobile entities, the method comprising:
    monitoring operation of the one or more mobile entities, including for each mobile entity of the one or more mobile entities, estimating a corresponding social behavior score for said entity based at least in part on the monitored operation, wherein estimating the social behavior score comprises determining a quantity representing a degree of one or more of cooperative and selfish behavior by the mobile entity;
    planning operation of the autonomous vehicle using the estimated social behavior score for each of the one or more mobile entities; and
    causing the autonomous vehicle to operate according to the operation,
    wherein estimating the social behavior score comprises estimating a Social Value Orientation (SVO).

8. The method of claim 7, wherein estimating the social behavior score comprises determining a quantity representing a degree of one or more of altruistic, prosocial, egotistic, competitive, and sadistic, behavior by the mobile entity.

9. The method of claim 1, wherein the social behavior score comprises a tuple of multiple component scores, each associated with a different behavior characteristic.

10. The method of claim 1, wherein planning the operation of the autonomous vehicle includes, for at least one mobile entity, predicting future operation of the mobile entity based on the social behavior score for said mobile entity.

11. The method of claim 10, wherein planning the operation of the autonomous vehicle includes, for each of the mobile entities, predicting future operation of the mobile entity based on the social behavior score for said mobile entity.

12. The method of claim 10, wherein predicting the future operation of the at least one mobile entity includes predicting said future operation according to a combination of a predicted utility of said operation and a utility of planned operation of the autonomous vehicle.

13. The method of claim 12, wherein the combination depends on the corresponding social behavior for said at least one mobile entity.

14. The method of claim 12, wherein planning the operation of the autonomous vehicle includes evaluating a utility function for operation of a vehicle according to weights for respective operation characteristics.

15. The method of claim 14, wherein the operation characteristics include one or more of road progress, comfort, desired velocities, tailgating penalty, collision avoidance, lane centering position, and road departure.

16. The method of claim 14, further comprising forming the utility function based on prior monitoring of vehicles and/or other mobile entities.

17. The method of claim 16, wherein forming the utility function comprises estimating the weights for respective operation characteristics.

18. The method of claim 12, wherein planning the operation of the autonomous vehicle includes using a same utility function for each of the one or more mobile entities.

19. The method of claim 18, wherein planning the operation of the autonomous vehicle includes using a utility function for the autonomous vehicle.

20. The method of claim 12, wherein the utility function depends on a location of the operation of the autonomous vehicle on a roadway system.

21. The method of claim 1, further comprising:
    selecting a social behavior score for the autonomous vehicle; and
    wherein planning the operation of the autonomous vehicle comprises planning said operation based on the selected social behavior score for the autonomous vehicle.

22. The method of claim 1, wherein the operation of the autonomous vehicles comprises at least an operation selected from a group of operations consisting of a lane change operation, a merge operation, and a turn across oncoming traffic.

23. An autonomous vehicle comprising a machine-implemented controller configured to:
    monitor interactions between one or more mobile entities and/or between the autonomous vehicle and the one or more mobile entities, including for each mobile entity of the one or more mobile entities, estimating a corresponding social behavior score for said entity based at least in part on the monitored interactions;
plan operation of an autonomous vehicle using the estimated social behavior score for each of the one or more mobile entities; and
cause the autonomous vehicle to operate according to the planned operation,
wherein planning the operation of the autonomous vehicle includes performing a computer-implemented multi-agent game-theoretically based decision process wherein estimating the social behavior score comprises estimating a Social Value Orientation (SVO).

24. A non-transitory machine-readable medium comprising instructions stored thereon, execution of the instructions by a data processing system causing:
monitoring interactions between one or more mobile entities and/or between the autonomous vehicle and the one or more mobile entities, including for each mobile entity of the one or more mobile entities, estimating a corresponding social behavior score for said entity based at least in part on the monitored interactions;
planning operation of an autonomous vehicle using the estimated social behavior score for each of the one or more mobile entities; and
causing the autonomous vehicle to operate according to the planned operation,
wherein planning the operation of the autonomous vehicle includes performing a computer- implemented multi-agent game-theoretically based decision process
wherein estimating the social behavior score comprises estimating a Social Value Orientation (SVO).

25. The method of claim 7, wherein planning the operation of the autonomous vehicle includes performing a computer-implemented multi-agent game-theoretically based decision process.

26. An autonomous vehicle comprising a machine-implemented controller configured to:
monitor operation of one or more mobile entities, including for each mobile entity of the one or more mobile entities, estimating a corresponding social behavior score for said entity based at least in part on the monitored operation, wherein estimating the social behavior score comprises determining a quantity representing a degree of one or more of cooperative and selfish behavior by the mobile entity;
plan operation of the autonomous vehicle using the estimated social behavior score for each of the one or more mobile entities; and
cause the autonomous vehicle to operate according to the operation,
wherein estimating the social behavior score comprises estimating a Social Value Orientation (SVO).

* * * * *